March 7, 1961  W. F. KLEMM  2,973,705
MOISTENING AND HEATING DEVICE
Filed Jan. 7, 1955  3 Sheets-Sheet 1
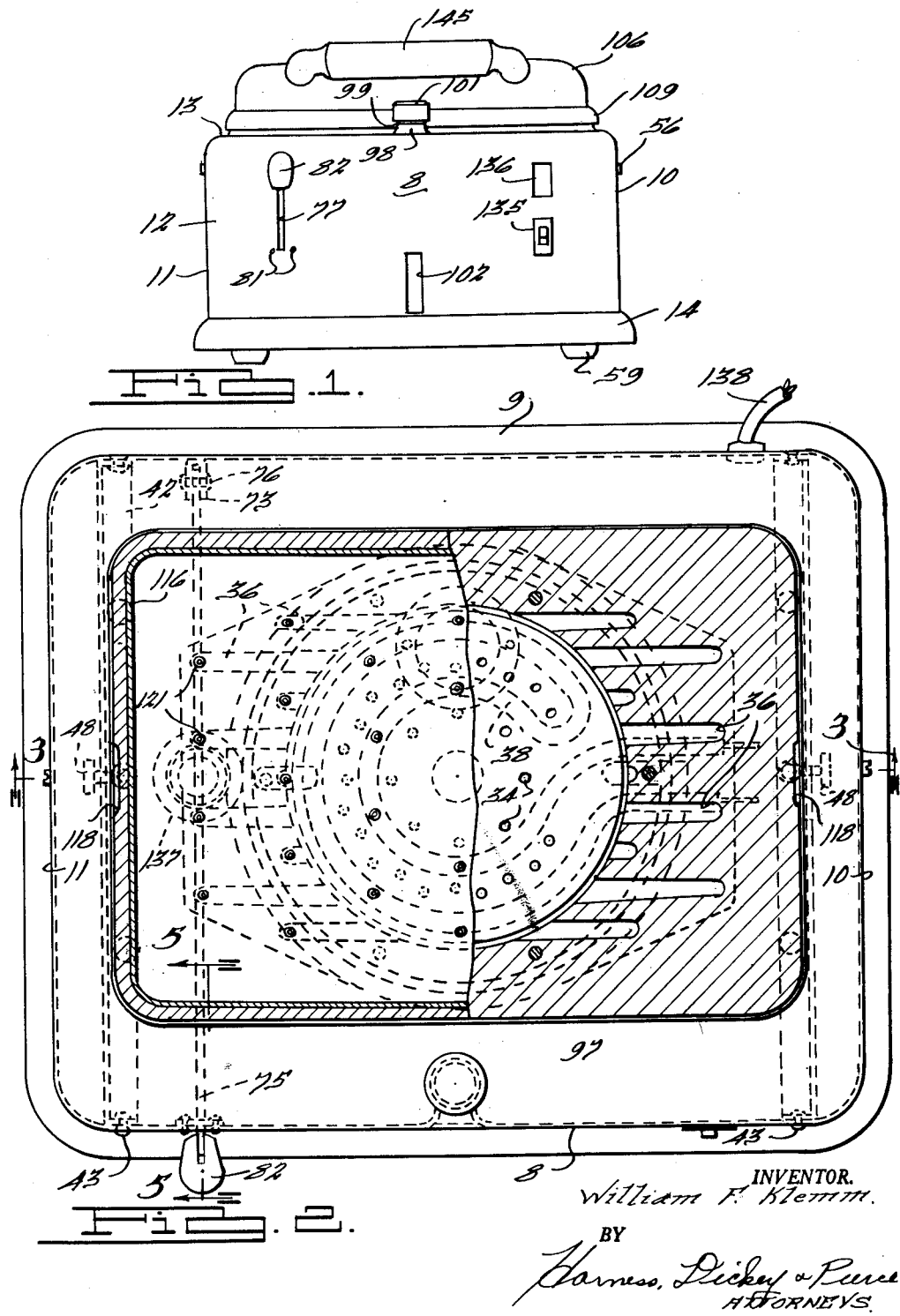
INVENTOR.
William F. Klemm.
BY
Harness, Dickey & Pierce
ATTORNEYS.

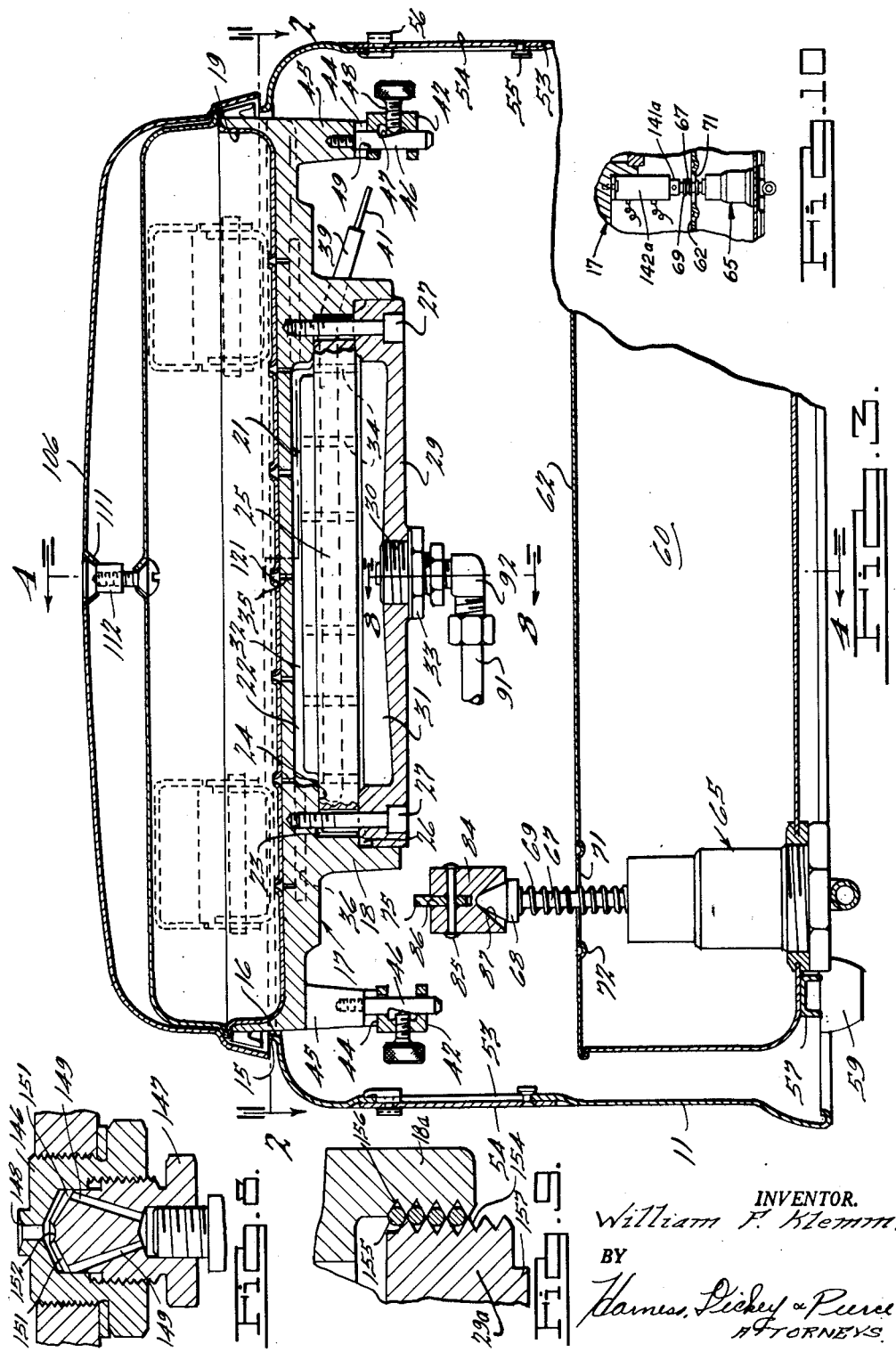

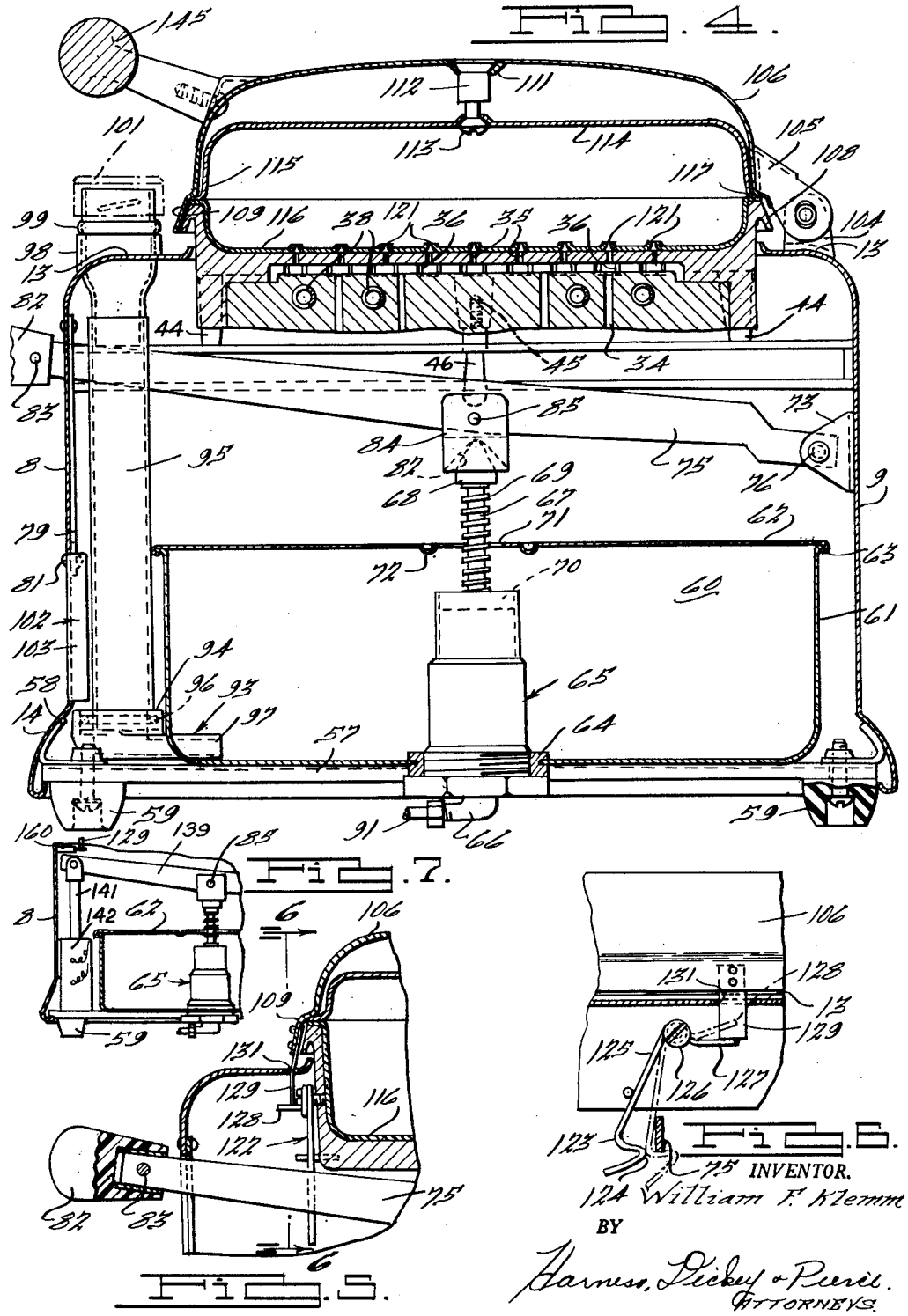

United States Patent Office 2,973,705
Patented Mar. 7, 1961

2,973,705

MOISTENING AND HEATING DEVICE

William F. Klemm, 17570 Prairie Ave., Detroit, Mich.

Filed Jan. 7, 1955, Ser. No. 480,539

10 Claims. (Cl. 99—234)

This invention relates to steam warming devices, and particularly to a device having a receptacle to which steam at high temperature is introduced at the will of the operator.

The subject matter of this application is a continuation-in-part of the application of W. F. Klemm, Serial No. 431,637, filed May 24, 1954, for Moistening and Heating Device. While the device of the prior application was similar to the present application, the main difference resides in the change in operational and functional elements of the device to reduce the weight thereof a substantial amount. While the casing and cover of the device of the prior application were made of cast aluminum to provide strength, the present case and cover are made from sheet material formed and stamped to a desired shape. The reduction in weight of the device and the use of the sheet metal case were made possible by providing a lever for operating the pump otherwise than by the cover as employed by the device of the prior application. Further, the steam and superheating compartments are formed in a manner that they may be readily serviced to have the residue of the water cleaned therefrom and from the apertures through which the steam and superheated steam pass. The receptacle for the article to be steamed is formed in unit relation to the steam and superheating steam chambers and the heating element.

The entire unit is supported within the case on a pair of spaced bars in a manner to be readily removed therefrom for replacement, repair, or for cleaning purposes. The water reservoir is a drawn stamping in the nature of a pan having a cover secured thereto, with the edges thereof crimped over the edges of the pan. The pump is supported directly in the bottom of the reservoir having a piston rod extending upwardly through a hole in the cover. The reservoir is supported upon two inverted channel elements which are secured to brackets in the end wall of the case with four supporting feet secured near the ends thereof. A lever is pivoted to a bracket on the rear wall of the case and is of such length as to extend through a slot in the front face thereof. The slot limits the downward movement of the lever which is connected to the piston rod of the pump, to thereby provide a mechanical advantage to the pump operation.

A conduit extends from the pump to the nozzle in the steam compartment in the same manner as disclosed in said prior application and a latch is provided for preventing the lever from being operated except at a time when the cover is closed. When the cover is moved to closed position, the latch for the lever is released. It is within the purview of the invention to employ a solenoid for operating the lever or the pump directly, as the case may be, in which arrangement a switch is provided, the contacts of which are moved to closed position either by the closing of the cover or directly by the operator.

Accordingly, the main objects of the invention are: to provide a steam heating device which has a steam chamber, a superheating chamber, and a compartment for articles, all formed as a unit, the elements of which are readily separable for cleaning, repair or replacement, the unit being releasably supported within the case; to provide a pump within the reservoir of the device operated by a lever which is pivoted to the rear wall of the case and which extends through a slot in the front wall thereof, providing a mechanical advantage to the operation of the pump; to provide a solenoid for operating the lever or the pump directly controlled by a switch which may be operated upon the closing of the cover or directly by the operator; to provide a latching mechanism for retaining the lever against operation except when the cover is in closed position, and, in general, to provide a steam heating device for articles which is simple in construction, positive in operation, and economical of manufacture.

Other objects and features of novelty of the invention will be specifically pointed out or will become apparent when referring, for a better understanding of the invention, to the following description taken in conjunction with the accompanying drawings, wherein:

Figure 1 is a view in elevation of a steam heating device for articles, embodying features of the present invention;

Fig. 2 is a sectional view of the structure illustrated in Fig. 3, taken on the line 2—2 thereof;

Fig. 3 is a sectional view of the structure illustrated in Fig. 2, taken on the line 3—3 thereof;

Fig. 4 is a sectional view of the structure illustrated in Fig. 3, taken on the line 4—4 thereof;

Fig. 5 is an enlarged, broken sectional view of the structure illustrated in Fig. 2, taken on the line 5—5 thereof;

Fig. 6 is a sectional view of the structure illustrated in Fig. 5, taken on the line 6—6 thereof;

Fig. 7 is a view of the pump illustrated in Fig. 3, having the lever thereof operated by a solenoid;

Fig. 8 is an enlarged sectional view of a portion of the structure illustrated in Fig. 3, taken on the line 8—8 thereof;

Fig. 9 is an enlarged broken view of structure, similar to that illustrated in Fig. 3, showing a further form thereof, and Fig. 10 is a broken view of structure, similar to that illustrated in Fig. 3, showing a further form of the invention.

Referring to the figures, the case for the steam generating device of the present invention is made from sheet material formed as a wrap-around stamped or drawn element having a front face 8, a rear face 9, and end faces 10 and 11. The case has vertical walls 12 which are rounded over at the top forming a ledge 13 which extends upwardly at 15 to form a central opening 16. At the bottom the vertical walls 12 are arched outwardly and downwardly and rolled inwardly to form the bead 14 around the bottom edge. An article receiving tray, heating element, and steam compartments are formed as a unit 17 from a main casting 18 having a marginal flange at the top forming a recess 19 for the articles. A stepped cylindrical aperture 21 is provided in the bottom of the casting. The recess 22 of smaller diameter adjacent to the bottom of the tray 19 forms the superheating chamber 32 for the steam, while the next stepped recess 23, forming a shoulder 24, receives the heating element 25. A closure plate 29 is mounted in the large outer recess 26, retained therein by screws 27. Between the plate 29 and the heating element 25 the steam chamber 31 is provided.

The central part of the closure element 29 has a threaded aperture 30 in which the exteriorly threaded nozzle is secured in sealed relation thereto. The heating element 25, as well as the casting 18 and closure element 29, are preferably made of aluminum because of its good heat conductivity. The heating unit 25 has a plurality of apertures 34 extending therethrough to permit the steam generated in the chamber 31 to pass into the chamber 32 where the steam is superheated. The superheated steam passes out through the apertures 35 of small diameter which extend through the bottom of the tray 19 throughout the entire area thereof. It will be noted from Fig. 2 that a plurality of horizontally disposed apertures 34 extend in the casting outwardly from a recess 22 having in the ends thereof apertures 35 through which the steam is delivered to the ends of the tray. The cast heating unit 25 has a heating element 38 of parallel circular form embedded therein, as illustrated in Fig. 2. The heating element is of the sheath-resistance type having the sheathed ends 39 extending outwardly of the casting 18 through apertures communicating with the stepped aperture 23 so as to have the terminal ends 41 available to be connected to an electric circuit.

A pair of inwardly presenting channel elements 42 is provided across the case near the end walls 10 and 11 thereof. The ends of the channel elements are secured to the front and rear walls 8 and 9 of the case by suitable means, herein illustrated as by rivets 43. The corners of the castings 18 have four legs 44 extending downwardly therefrom and a central leg 45 is provided therebetween. The ends of the legs 44 converge to a small area when resting upon the upper flange of the channel elements 42, providing a minimum area for the conductivity of the heat from the unit 17 to the case. The central leg 45 supports a rod 46 having a tapered notch 47 therein which is engaged by a screw 48 when the rod extends through an aperture 49 in the flanges of the channel members. With this arrangement, the four legs 44 support the unit 17 within the case while the screws 48 engaging the sloping walls of the notches 47 securely lock the unit to the channel elements.

The end walls 10 and 11 are provided with openings 53 aligned with the screws 48 and enclosed by removable plates 54. Rivets 55 are provided below the bottom of the opening for securing the bottoms of the plates 54, while rotatable locking fingers 56 near the top edges of the openings retain the plates over the openings. When the plates 54 are removed, the screws 48 are rendered accessible so that they may be loosened for permitting the entire unit 17 to be removed from the aperture 16 of the case.

A pair of downwardly presenting channel elements 57 extends across the bottom of the case beneath the channel elements 42. Brackets 58 are secured to the bead 14 at the bottom edge of the case and to the ends of the channel elements 57. Four supporting feet 59 are secured at the corners of the case to the channel members 57 by suitable means, herein illustrated as by bolts. The channel elements 57 support the reservoir 60 which comprises a panlike member 61 enclosed by a cover 62 which is secured in fixed relation thereto when the edges thereof are rolled over the edges of the member 61, as shown at 63 of Fig. 4.

A threaded washerlike element 64 is secured in sealed relation centrally of the width of the reservoir 60 near one end thereof for receiving the threaded end of the pump 65 which is secured thereto. The pump 65 is of a type illustrated in the above-mentioned copending application having a cylinder portion in which a piston 70 is operated. The piston is supported on a rod 67 having a conical end 68 thereon which is of substantially 60° taper. A spring 69 encompasses the rod and the end 68 forces the piston and rod to uppermost position. The piston has an intake port communicating with the interior of the reservoir 60 and an outlet port at the bottom terminating in an elbow 66. Valves are provided in the ports for controlling the flow of fluid into and out of the pump, as illustrated and described in the above-mentioned copending application. The cover 62 of the reservoir has an aperture 71 therein strengthened by the annular bead 72 thereabout and through which the piston rod 67 and spring 69 extend.

A bifurcated bracket 73 is secured to the rear wall 9 to which a lever 75 is secured by a pivot 76. The front end of the lever extends through an elongated slot 77 in the front wall 8 of the case which is reinforced by a slotted plate 79, secured thereto by suitable means, herein illustrated as by rivets 81. A removable handle 82 is secured on the forward end of the lever 75 by a removable screw 83 which permits the handle and screw to be shipped within the carton, to thereby reduce the size of the shipping container. A cylindrical block 84 has a slot 86 therein which receives the lever 75 to which it is secured by a pin 85. The bottom of the block is provided with a conical recess 87 having a substantially 90° taper to provide a clearance between the conical recess 87 and the conical end 68 of the piston rod. The distance between the pivot 76 and pin 85 of the lever 75 is substantial relative to the angular movement of the lever so that very little lateral movement will occur between the end 68 of the piston rod and the block 84, and any binding between the piston and the cylinder is thereby eliminated.

A conduit 91 extends from the elbow 66 and is secured to an elbow 92 which is connected to the spray nozzle 33. A fitting 93 is sealed to the wall of the panlike element 61 of the reservoir, having a cylindrical end 94 for receiving a transparent tube 95 which is sealed thereto by an O-ring 96. The end 97, which extends within the reservoir, is of rectangular shape having the capacity of the tube 95. A cylindrical flange 98 extends upwardly from the ledge 13 of the case, having a fitting 99 extending therein and into the upper end of the transparent tube 95, with a closure cap 101 provided therefor. A viewing opening 102 is provided in the front wall 8 of the case, having wall portions 103 bent inwardly at each side of the opening through which the height of the water within the tube 95 may be observed.

Hinge brackets 104 are mounted on the ledge 13 adjacent the rear wall 9 of the case, being disposed in pivotal relation to hinge brackets 105 on a cover 106. It will be noted that the flange forming the tray 19 of the casting 18 has an angularly disposed flange 108 about the edge thereof which is encompassed by a sloping flange 109 about the edge of the cover when the latter is in closed position. The cover has a central countersunk opening 111 in which a headed nut 112 is disposed for receiving a screw 113 for supporting an inner inverted panlike member 114 within the cover 106. A marginal flange 115 on the inner member 114 engages the offset shoulder of the outer cover 106 at the base of the marginal sloping flange 109.

Within the tray 19 a removable panlike element 116 is mounted, having the same shape as the tray and having a lateral flange 117 about the edge. It will be noted from Fig. 2 that portions of the flange 108 are eliminated at the central portion 118 of the sides of the casting 18, permitting the finger of the operator to extend within the recesses and engage the flange 117 of the platelike element 116 to permit it to be readily removed from the tray. Aligned with each of the apertures 35 in the tray bottom are enlarged apertures 121 in the bottom of the panlike element 116, with the metal about the apertures flanged upwardly. This prevents any liquid residue from the heated material from flowing directly into the tray and being caught within the bottom of the panlike element. The panlike element is desirable since it was found that not only is the device useful for heating dry materials but foods containing fats, water and the like may be cooked within the tray in a very few seconds of time. Since discharged fluids from foods and materials being heated would be difficult to remove from the tray, in view of the openings 35, a separate tray 116 is provided.

To make certain that the cover is closed when the lever 75 is operated to direct water into the steam chamber 31, a latching mechanism 122 is provided for positively retaining the lever against movement when the cover is open. In this arrangement, a wire is shaped to form a blocking detent 123 by an end portion 124 which extends beneath the lever, as shown in dot and dash line in Fig. 6. The wire has a turn therein at 125 through which a screw 126 extends to support the detent on the front wall of the unit 17. An extension 127 of the detent, having a forwardly projecting arm 128 thereon, is disposed in position to be engaged by a finger 129 which is secured on the sloping flange 109 of the cover 106. The finger 129 passes through an aperature 131 in the case when the cover 106 is near the end of its closing movement, which thereafter engages the arm 128 and rocks the latch lever 123 clockwise to remove the blocking detent 123 from beneath the lever 75, which thereby permits the lever to be moved downwardly. When the lever is released, the spring 69 moves the piston and the lever 75 to their uppermost positions, whereupon, when the cover 106 is again raised, the detent 123 will swing in a counterclockwise direction and extend beneath the forward end of the link 75 and thereby retain the link against downward movement.

The wiring diagram for the device is the same as that illustrated, described and claimed in the above-mentioned copending application. A switch 135 is provided on the front wall 8 of the casing for controlling the heating element to "on" and "off" positions. Above the switch a red bulls-eye 136 is provided which is illuminated when the heating element of the device is connected in the circuit. The heating element is connected in the circuit along with the thermostat 137 which is disposed within a recess in the bottom of the casting 18, as illustrated in Fig. 2. A flexible conductor 138 extends from the rear face 9 of the case for permitting the circuit of the device to be connected to a service outlet located adjacent to the device.

In Fig. 7 a lever 139 is illustrated as terminating within the case with its forward end secured to an armature 141 of a solenoid 142 with a slot and pivot connection. The spring 69 of the pump returns the solenoid and lever, as well as the piston, to their uppermost positions. The solenoid urges the piston rod and lever downwardly when energized. As illustrated in Fig. 10, the armature 141a of the solenoid 142a could be directly connected to the piston rod 67 which would decrease the length of the armature stroke while requiring increased force to operate the pump 65. A handle 145 of conventional form is provided on the cover 106 by which it is moved to open and closed positions.

In Fig. 8 the spray nozzle is illustrated as being made from two parts, a body 146 which is secured to the casting 18 and a plug 147 threaded therein. The body 146 has the central opening and the conical sloping surface 148, while the plug has the pair of apertures 149 and 151, the latter communicating with a central semispherical recess 152. The nozzle functions in the same manner as that described in the above mentioned copending application.

In Fig. 9 the plate 29a is illustrated as being provided with a thread 154 which engages a thread formed by a coil of wire 155 disposed in a thread 156 on the inner wall of the recess 26 of the casting 18a. Lugs 157 are provided on the plate by which the plate may be tightened or released by tapping with a hammer or the like. This construction eliminates the screws employed in the plate 29 illustrated in Fig. 3.

What is claimed is:

1. A steaming device for articles including, in combination, a case having front, rear and end walls and an opening at the top, a tray unit having a recess for the articles, having a superheating steam compartment below said tray unit, having a heating element below the superheating steam compartment and having a steam compartment below said heating element all as a unit supported within the top opening of said case.

2. A tray and steam forming unit embodying an element having an article receiving recess in the top and stepped recess portions in the bottom forming a downwardly presenting shoulder, a heating unit engaging said shoulder to form a superheating chamber thereabove, a plate engaging said heating unit and retaining it against the shoulder while leaving an open space therebelow forming a steam generating chamber, and a nozzle on said plate for admitting water into the last chamber.

3. A tray and steam forming unit embodying an element having an article receiving recess in the top and stepped recess portions in the bottom forming a downwardly presenting shoulder, a heating unit nested within said shoulder and forming a superheating chamber thereabove, a plate engaging said heating unit and retaining it against the shoulder while leaving an open space therebelow forming a steam generating chamber, and a nozzle on said plate for admitting water into the last chamber, said heating unit and said element having apertures therethrough which permit the passage of the steam from the steam generating chamber to the superheating chamber from which it passes into the article receiving recess.

4. A tray and steam forming unit embodying a casting having an article receiving recess in the top and stepped recess portions in the bottom forming a shoulder, a heating unit engaging said shoulder to form a superheating chamber thereabove, a plate engaging said heaing unit and retaining it against the shoulder while leaving an open space therebelow forming a steam generating chamber, a nozzle for admitting water into the last chamber, said heating unit and said casting having apertures therethrough which permit the passage of the steam from the steam generating chamber to the superheating chamber from which it passes into the article receiving tray, a case, and means for supporting said unit in said case.

5. A tray and steam forming unit embodying a casting having an article receiving recess in the top and stepped recess portions in the bottom forming a shoulder, a heating unit engaging said shoulder to form a superheating chamber thereabove, a plate engaging said heating unit and retaining it against the shoulder while leaving an open space therebelow forming a steam generating chamber, a nozzle for admitting water into the last chamber, said heating unit and said casting having apertures therethrough which permit the passage of the steam from the steam generating chamber to the superheating chamber from which it passes into the article receiving tray, a case, a pair of bars within said case extending thereacross near the upper part thereof on which said unit is supported, with the article receiving recess accessible at the top of the case, a pair of bars extending across said case near the bottom thereof, four supported feet secured near the ends of said last bars projecting below the case, a reservoir secured to said last pair of bars within the case, a threaded aperture on the bottom of said reservoir, a pump having a piston rod therein disposed within said reservoir and threaded in said aperture, said pump having an intake port within the reservoir and an outlet port outside thereof, a lever pivoted to one wall of said case and extending through a slot in the opposite wall thereof, a conical end on said piston rod, and a block secured to said lever having a conical recess receiving the conical end of said piston rod, said recess being of greater angularity to provide clearance.

6. A tray and steam forming unit embodying a casting having an article receiving recess in the top and stepped recess portions in the bottom forming a shoulder, a heating unit engaging said shoulder to form a superheating chamber thereabove, a plate engaging said heating unit and retaining it against the shoulder while leaving an open space therebelow forming a steam generating chamber, a nozzle for admitting water into the last chamber, said heating unit and said casting having apertures therethrough which permit the passage of the steam from the steam generating chamber to the superheating chamber from which it passes into the article receiving tray, a case, a pair of bars within said case extending thereacross near the upper part thereof on which said unit is supported, with the article receiving recess accessible at the top of the case, a pair of bars extending across said case near the bottom thereof, four supported feet secured near the ends of said last bars projecting below the case, a reservoir secured to said last pair of bars within the case, a threaded aperture on the bottom of said reservoir, a pump having a piston rod therein disposed within said reservoir and threaded in said aperture, said pump having an intake port within the reservoir and an outlet port outside thereof, a lever pivoted to one wall of said case and extending through a slot in the opposite wall thereof, a conical end on said piston rod, a block secured to said lever having a conical recess receiving the conical end of said piston rod, said recess being of greater angularity to provide clearance, and a spring about said piston rod urging said conical end into the recess of said block.

7. A tray and steam forming unit embodying a casting having an article receiving recess in the top and stepped recess portions in the bottom forming a shoulder, a heating unit engaging said shoulder to form a superheating chamber thereabove, a plate engaging said heating unit and retaining it against the shoulder while leaving an open space therebelow forming a steam generating chamber, a nozzle for admitting water into the last chamber, said heating unit and said casting having apertures therethrough which permit the passage of the steam from the steam generating chamber to the superheating chamber from which it passes into the article receiving tray, a case, a pair of bars within said case extending thereacross near the upper part thereof on which said unit is supported, with the article receiving recess accessible at the top of the case, a pair of bars extending across said case near the bottom thereof, four supported feet secured near the ends of said last bars projecting below the case, a reservoir secured to said last pair of bars within the case, a threaded aperture on the bottom of said reservoir, a pump having a piston rod therein disposed within said reservoir and threaded in said aperture, said pump having an intake port within the reservoir and an outlet port outside thereof, a lever pivoted to one wall of said case and extending through a slot in the opposite wall thereof, a conical end on said piston rod, a block secured to said lever having a conical recess receiving the conical end of said piston rod, said recess being of greater angularity to provide clearance, a spring about said piston rod urging said conical end into the recess of said block, and a fill conduit extending from the top of the case downwardly to the bottom of the reservoir, a portion of said conduit being transparent, said case having a slot therein aligned with said transparent portion of said fill conduit.

8. A steaming device as recited in claim 1, wherein a reservoir is provided in said case, a pump in said case communicating with said reservoir, and a solenoid for operating said pump.

9. A steaming device as recited in claim 1, wherein a reservoir is provided in said case, a pump in said case communicating with said reservoir, a solenoid for operating said pump, and a switch on said case for completing a circuit to said solenoid actuated when said cover is moved to closed position.

10. A steaming device as recited in claim 1, wherein a reservoir is provided in said case, a pump in said case communicating with said reservoir, a solenoid for operating said pump, and a lever pivoted at one end to said case with the other end engaged by said solenoid, said pump engaging said lever between said pivot and solenoid.

References Cited in the file of this patent

UNITED STATES PATENTS

| | | |
|---|---|---|
| 284,295 | Hailes | Sept. 4, 1883 |
| 2,191,975 | Stephens | Feb. 27, 1940 |
| 2,585,334 | McCauley | Feb. 12, 1952 |
| 2,617,349 | Tucker | Nov. 11, 1952 |
| 2,620,789 | Gregory | Dec. 9, 1952 |
| 2,636,969 | Lewis | Apr. 28, 1953 |
| 2,674,935 | Lewis et al. | Apr. 13, 1954 |
| 2,719,211 | Lewis et al. | Sept. 27, 1955 |
| 2,728,841 | Whitlock | Dec. 27, 1955 |
| 2,743,665 | Gustafson | May 1, 1956 |

FOREIGN PATENTS

| | | |
|---|---|---|
| 467,523 | Great Britain | June 18, 1937 |